Dec. 10, 1963    S. P. KINNEY ETAL    3,113,585
VALVES AND OPERATING MECHANISM THEREFOR
Filed Jan. 25, 1962    3 Sheets-Sheet 2

INVENTORS
SELWYNE P. KINNEY and
HUGH B. CARR
BY their ATTORNEYS

Dec. 10, 1963 S. P. KINNEY ETAL 3,113,585
VALVES AND OPERATING MECHANISM THEREFOR
Filed Jan. 25, 1962 3 Sheets-Sheet 3

INVENTORS
SELWYNE P. KINNEY and
HUGH B. CARR
BY

*their* ATTORNEYS

United States Patent Office 3,113,585
Patented Dec. 10, 1963

3,113,585
VALVES AND OPERATING MECHANISM THEREFOR
Selwyne P. Kinney, Pittsburgh, and Hugh B. Carr, Carnegie, Pa., assignors to S. P. Kinney Engineers, Inc., Carnegie, Pa., a corporation of Pennsylvania
Filed Jan. 25, 1962, Ser. No. 168,698
4 Claims. (Cl. 137—315)

This invention relates to large, heavy valves for use in industrial operations, and to a valve-operating mechanism therefor. More particularly the invention relates to valves of the type in which a valve element is moved vertically by means of a valve stem attached thereto and connected with a power-driven operating mechanism, and is especially designed for use in applications where the valve may need to be opened at rather frequent intervals for repair or replacement of parts on the interior.

For example, in the operation of a blast furnace, a large, heavy mushroom valve is interposed between the hot blast outlet port of the stove and the hot blast main. The mushroom valve element weighs hundreds of pounds. It is lifted on and off its seat by a valve lifting mechanism, the valve usually being lifted by power and being closed by gravity. The mechanism generally employed in such case is a cable attached to the valve stem or movable valve element with a winch type of mechanism on which the cable is wound or unwound with the raising or lowering of the valve. These valves must be opened at relatively frequent intervals for repair or replacement of the mushroom valve element.

Valves located such as this in a hot blast outlet are generally connected into the hot gas main without being anchored to the foundation on which they may set, so that apperciable shifting of the valve may take place with expansion or contraction of the main. For this reason also, the valve-operating mechanism is generally located on a separate structure located above the valve with the cable from the winch to the valve stem providing the necessary flexibility to permit the shifting of the valve body relative to the operating mechanism with such expansion and contraction.

Other types of valves, such as large gate valves, are used in blast furnace stove burners or chimney valves. Generally they have a vertically-movable gate or one or more valve disks that are raised and lowered to open and close the valve. Such valves are also used of course in various other industrial operations, and the conditions of use require that they be opened from time to time for repair of a valve gate or valve seat, or replacement of some internal part of the valve.

As heretofore generally constructed, a lifting crane or a derrick of some kind must be brought into position above the valve in order to open it up for repair or replacement of parts. This often involved a loss of time waiting for the hoisting mechanism, such as the crane, to become available, or the crane had to be tied up with this work when it was needed for other purposes. Moreover, the location of the valve-operating mechanism is usually such as to interfere with the hoisting mechanism being positioned directly over the valve so as to give a direct vertical lift when the valve has to be opened or the parts replaced after repairs have been made.

The present invention is applicable to any valve having a body, a bonnet, and a valve element on the interior of the body that is raised and lowered by a valve stem attached to the valve element and passing upwardly through the bonnet, and the primary object of the invention is to provide a valve structure and valve-operating mechanism so arranged that the mechanism which operates the valve may also be used to lift those parts which are removable from the valve body when the valve is to be opened for repairs.

According to the present invention the valve stem-operating mechanism, which is power-driven, is carried by a rigid structural frame supported on the valve body entirely independently of the hood of the valve. This structure includes a vertical frame or cage that extends up two sides of the valve stem but is open vertically up at least one side to provide a vertical clearance opening. This cage or frame provides the mounting for the valve-operating mechanism and its drive and a guideway for the upper end of the valve stem, and it also provides a guideway for a counterweight. By unbolting the bonnet from the valve body and operating the valve stem lifting mechanism beyond its normal range of movement, the valve element and the bonnet may be lifted clear of the body when it is necessary to secure access to the interior of the valve, and these parts may be held suspended above the body of the valve, or where necessary, a crane or lifting device may be brought to position alongside the frame after the valve has been opened in this way, and after the valve stem is secured to the lifting device the operating mechanism can be disconnected from the valve stem, and then the valve stem, with the bonnet and attached valve parts suspended therefrom, moved laterally through the clearance opening to a location entirely clear of the valve. Many repairs may be made simply by raising the parts with the valve-operating mechanism, but in case of a major repair, such as a replacement of a mushroom, the lifting crane would be brought into use only after the parts had been raised in the manner above described and required thereafter only until the assembly is put back in elevated position.

Since the structure which carries the valve-operating mechanism is mounted entirely on the valve body, the valve-operating mechanism will move about with the valve body when there is any shifting due to expansion or contraction, and the relative position between the valve-operating mechanism and the valve body never changes. Hence it is unnecessary to use flexible cables, and the valve-operating mechanism can be directly connected with the valve stem to effect both an opening and positive closing movement of the valve, and gravity is not relied upon to assure the mushroom being properly seated.

Our invention may be more fully understood by reference to the accompanying drawings which illustrate certain embodiments thereof, and in which.

Figure 1:
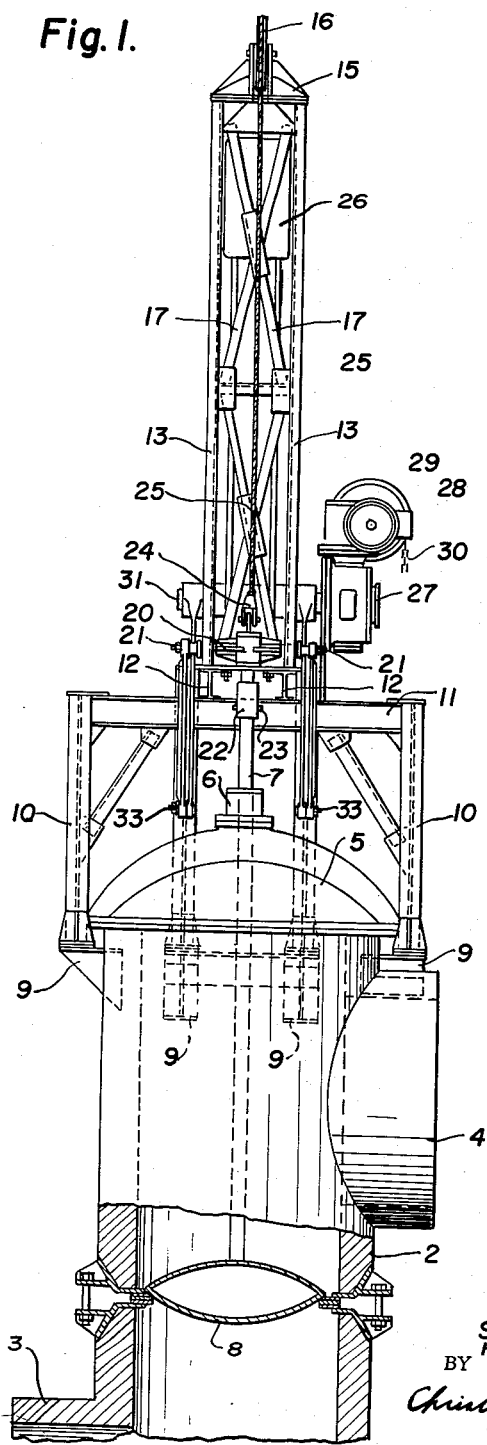
FIG. 1 is a side elevation of a mushroom valve of the type referred to constructed in accordance with this invention.
Figure 2:
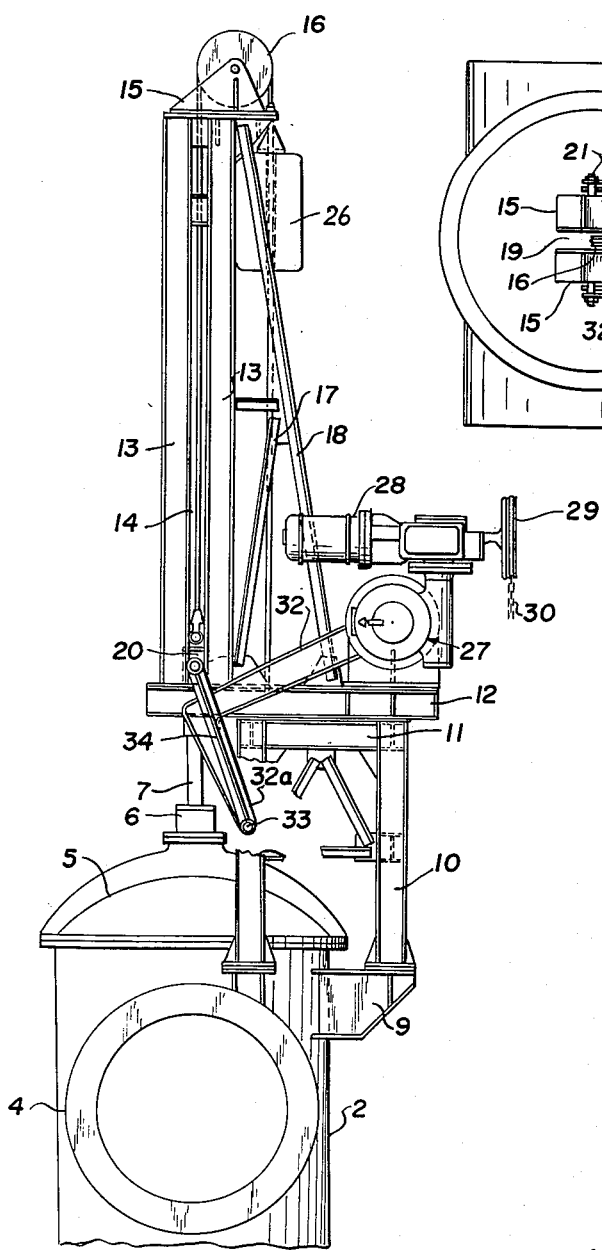
FIG. 2 is an elevation at right angles to FIG. 1.
Figure 3:
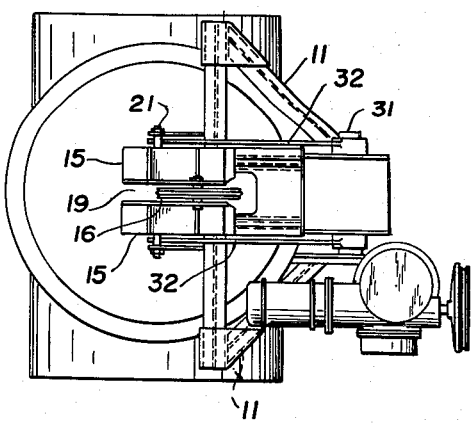
FIG. 3 is a top plan view of the apparatus shown in FIG. 2.

Referring first to the construction shown in FIGS. 1, 2 and 3, 2 designates the body of a mushroom valve of the type used in various industrial plants, as for example between a blast furnace stove and the hot blast main. It has an inlet connection 3 at its lower end and an outlet connection 4 at its upper end. Bolted to the top of the body is a bonnet 5 having a gland 6 in the top thereof. A valve stem or operating stem 7 extends downwardly through the gland into the interior of the body and at its lower end has affixed thereto the mushroom valve element 8. These parts, which form per se no part of the present invention, are more or less schematically illustrated.

Welded or otherwise attached to the upper part of the body below the bonnet are a plurality of brackets 9 on which are vertical columns 10. Connecting the tops of the columns 10 are structural members 11, and above these members 11 are parallel beams 12, one of the beams 12 being located at each side of the path of vertical travel of the valve stem 7. By reference to FIG. 2, it will be seen that the elements 11 and 12 together form a kind of horizontal platform that extends over the bonnet 5 and is spaced above the bonnet. Extending upwardly from each of the columns 12 is a pair of vertical columns 13, these columns 13 being spaced from each other, providing between them a vertical guideway 14. The two pairs of columns 13 are connected at their upper ends by a mounting structure 15 for a sheave 16. The columns may be braced as indicated, by diagonal bracing 17 and inclined struts 18. The frame thus constructed as viewed in FIG. 2, somewhat resembles an A-frame with the left-hand leg of the frame vertical and the members 18 sloping downwardly and outwardly away from the columns.

As viewed in FIG. 1, it will be seen that the structural frame thus provided is tied together by the braces 17 on one side of the path of movement of the vertical stem 7, and is closed on each of two sides of the path of travel of the stem by the pairs of columns 13. However there is a vertical clearance opening 19 best shown in FIG. 3, which begins with the space between the parallel beams 12 and extends up the height of the frame to the mounting structure 15.

Spanning the space between the two pairs of columns 13 is a cross head 20, the ends of which project through the guideways 14 with studs 21 extending beyond the planes of the columns 13 at each side of the frame. Secured to the under side of the cross head 20 is a coupling 22 through which the cross head is releasably connected to the valve stem 7. A removable key or pin 23 is shown in FIG. 1 to indicate the connection between the coupling 22 and the stem 7 as being a releasable connection.

At the top of the cross head 20 there is a lug to which is pivotally connected a clevis 24 at the end of a cable 25. This cable passes over the sheave 16 at the top of the frame. On the rear of the frame, i.e., the side of the frame away from the vertical opening 19, the uprights 13 provide a slideway for a counterweight 26 that is attached to the other end of the cable 25.

The mechanism for operating the valve comprises a worm type reducing gear 27 of usual construction which may be driven by an electric motor 28, but which is also desirably provided with a sprocket wheel 29 for operating the mechanism by means of a chain 30 passing around the sprocket wheel should there be any failure of the motor. This reducing gear drives a shaft 31, and on each end of the shaft 31 there is a lifting arm 32 which is keyed to the shaft at one end, and which has a downwardly-turned angular extension 32a at its outer end. This extension terminates close to the bonnet of the valve, and its lower terminal, when the valve is closed, is in the position shown in FIG. 2, where the main end of the arm 32 is about in line with the valve stem 7, and the angular arm 32a is somewhat to the right of the valve stem as shown in this figure. On the terminal of each downward extension 32a there is a crank pin or stud 33. A link 34 has its lower end connected to the stud 33 and its upper end connected to the stud 21 at each end of the cross head 20. Thus the driving mechanism comprises the shaft 31 which can be rotated, and which has at each end parallel arms 32 with downwardly-projecting extensions 32a and these in turn are connected by parallel links 34 with the opposite ends of the cross head 20. Parallel crank arms 32 and parallel links 34 are of course desirable to balance the stresses at each end of the cross head 20.

In the normal operation of the valve, the mushroom 8 can be moved from the closed position shown in FIG. 1 to a position in the upper part of the body and under the bonnet where it is out of the gas stream flowing through the outlet connection 4. It is raised by operating the mechanism above described to swing the arms 32 clockwise from the position shown in FIG. 2 upwardly, which in turn transmits a thrust through links 34 to the cross head 20. The shape of the crank arms 32 with their terminal portions 32a below the axis of rotation of the shaft 31 in the manner described enables the vertical thrust to be exerted on the cross head while decreasing the height of the drive structure below that required if a straight arm were used. Under normal conditions of operation, the valve stem will be lifted only sufficiently to move the valve element 8 between its closed and its open position. However, should it be necessary to gain access to the valve or the valve seats, or to repair or replace parts, the bonnet 5 may be unbolted from the body. Then by continuing to rotate the drive mechanism beyond its normal operating range after the mushroom valve 8 is already raised into the bonnet, the bonnet and the valve element 8 may be lifted above the top of the valve body and clear off the valve body. This additional lifting is done by continuing the movement of the valve stem in a vertical direction without biasing or twisting the valve stem, and by the regular mechanism that opens and closes the valve. After the valve bonnet has been raised clear of the valve body, the parts may be held suspended in this position for an indefinite period of time. When necessary, an overhead crank or lifting derrick, depending upon the environment in which the valve is located, may be attached to the valve stem or engaged with the bonnet and the valve element 8, after which the key or pin 23 may be released from the coupling 22. The valve stem may then be moved laterally out of the frame and the bonnet and the mushroom valve element will of course move at the same time from under the platform-like structure provided by the beams 11 and 12. The valve stem, bonnet and valve element may thus be swung clear of the upright frame.

Figure 5:
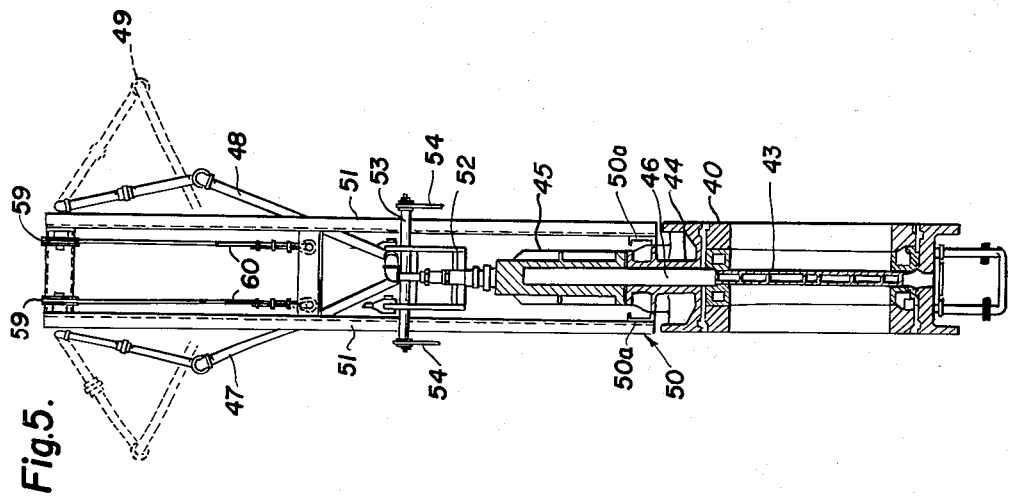
FIG. 5 is an elevation of the apparatus shown in FIG. 4 at right angles to the position shown in FIG. 4, certain parts, however, being shown in vertical section with the section being in the plane of line V—V of FIG. 4.

In the construction shown in FIGS. 4 and 5 the same general arrangement is illustrated in connection with a water-cooled gate type of valve. In these figures, 40 designates a valve body with a valve passage therethrough, and movable across the valve passage is a water-cooled gate 43. The valve body has an upward extension 44 and at the top of this body portion 44 there is a bonnet 45. When the valve is closed the valve disk or gate 43 is disposed transversely across the passageway in the valve body, as shown in FIG. 5, but when the valve is open the gate 43 is drawn up into the vertical extension 44 of the valve body 40 and the bonnet 45. A valve stem 46 is attached to the gate and extends upwardly through the bonnet. Provision is made for the circulation of water through the valve stem into the gate, and then concentrically up the valve stem to a point exteriorly of the body. This arrangement is not in itself any part of the present invention. Water inlet and outlet pipes are provided at 47 and 48 respectively, these pipes having knuckle joints 49 intermediate their ends to enable the valve stem to move up and down without interrupting the continuity of the flow of water. Flexible hose may sometimes be substituted.

According to the present invention the valve body has a structural frame 50 welded or otherwise rigidly secured thereto below the level of the removable bonnet 45. Extending upwardly from this structure 50 are parallel vertical columns 51, each comprised of two angular bars with their flanges confronting each other. There is a crosshead 52 including a lifting bar 53 guided in the frame provided by these upright columns, the ends of the lifting-bar 53 projecting through the space between the pairs of upright angles and projecting beyond the sides of the columns as best shown in FIG. 5. A link 54 is attached to each end of this lifting bar. These links are pivotally connected at their lower ends to a pin at the end of a crank arm 55, these arms being at opposite ends of a shaft 56. The shaft 56 is driven through a reducing gear either from a motor 57 as previously described in connection with FIG. 2, or by a hand-operated chain and sprocket wheel 58.

Figure 4:
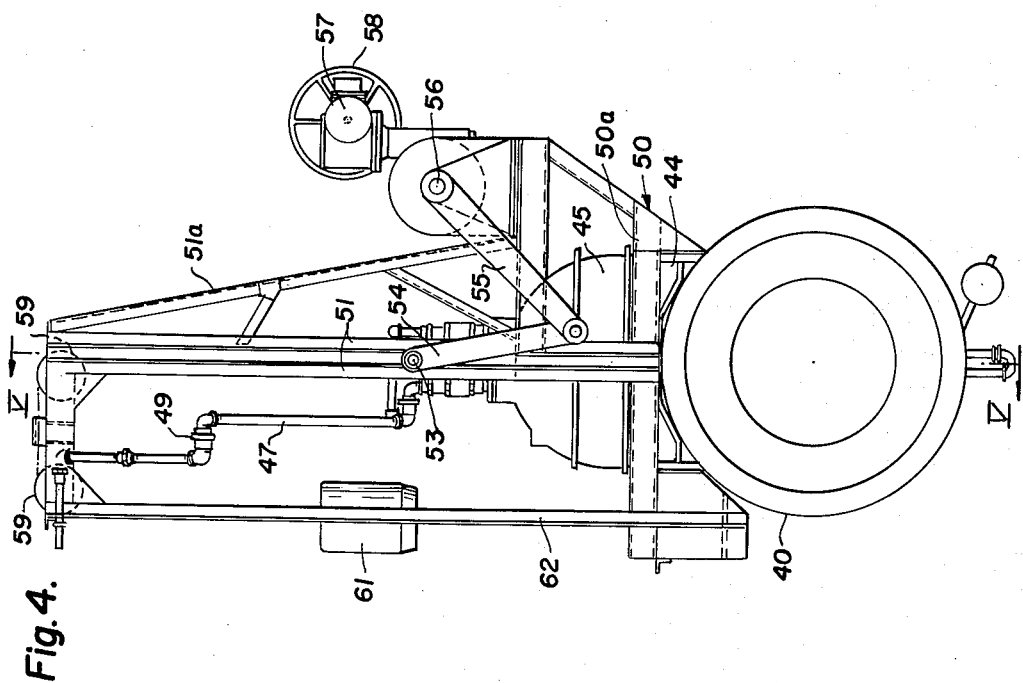
FIG. 4 is a side elevation showing our invention applied to a gate or disk-type valve with a water-cooled gate.

The upright columns 51 are braced by downwardly and outwardly-sloping bracing elements 51a as indicated in FIG. 4, and at the top of these columns there is a horizontal frame structure which houses parallel tandem sheaves 59. Parallel cables 60 attached to the cross-head or lifting bar pass over the sheaves 59 and have their opposite ends attached to a counterweight 61 which is guided on parallel upright structural members 62. As best seen in FIG. 5, the base frame 50, which is secured to the valve body, is comprised of parallel structural beams of channel section 50a, and the columns 51 and 62 are attached to the outsides of these beams so that there is a space between the columns from the level of the beams 50a to the top of the frame structure that is open to the left as best viewed in FIG. 4. Since there are parallel cables 59, there is adequate clearance between them for the valve bonnet to pass between them over top of the counterweight 61 when the valve is operated beyond its normal range.

In normal operation the valve is opened and closed through its normal operating range by the driving gear above described. In this range of movement the counterweight does not travel below the level of the valve bonnet. When it is desired to have access to the interior of the valve, the valve bonnet is unbolted from the body and the operating mechanism is operated to move the valve stem upwardly beyond its normal range, whereupon the counterweight 61 goes further down and the valve bonnet is lifted above the body and to a level where the gate and bonnet may be carried laterally toward the left as viewed in FIG. 4 from between the uprights 51 and 62.

The operating levers 55 in this modification are not shown with downwardly-extending portions as in FIG. 2, but the mechanism of FIG. 2 might be used in FIG. 4, or vice versa.

In both forms here specifically described the valve has a body, a removable bonnet and a valve stem passing through the body and is connected at its lower inner end to a movable valve element. In each, there is a frame structure mounted on the valve body below the bonnet and which extends upwardly at each side of the valve stem, or its path of vertical travel. This frame is open vertically from top to bottom along one side of the structure so that clearance is provided for the valve stem, and parts which are hung onto it when the bonnet is unbolted may be moved laterally from over the valve body. In each the mechanism that raises and lowers the valve in normal operation has adequate overtravel to lift the bonnet in the manner described.

While we have shown and described certain specific embodiments of our invention it will be understood that this is by way of illustration and various modifications and changes may be made therein within the scope of our invention.

We claim:

1. The combination with a valve having a body, a detachable bonnet at the top of the body, a movable valve element in the body movable in a normal range between an open and closed position and movable from the open position against the interior of the bonnet, a valve stem passing through the bonnet connected with the movable valve element, of a supporting structure secured to the valve body overhanging and spaced above the valve bonnet, said supporting structure having a vertical column through which the valve stem moves axially when moving the valve element, said column having a height greater than that required for the normal range of movement of the valve stem between its open and closed position, said column being open along one side from top to bottom, a cross head attached to the upper end of the valve stem, guided for vertical movement in the column, operating mechanism on the supporting structure for positively raising and lowering the cross head operative for moving the cross head from the closed position of the valve when the cross head is at the lowermost range of its travel to a position where the bonnet and movable valve element are lifted clear of the valve body, the valve stem being detachably secured to the cross head, the valve stem and bonnet being removable laterally when raised to the position last named through the open side of the vertical column.

2. The combination with a valve having a body, a detachable bonnet at the top of the body, a movable valve element in the body movable in a normal range between an open and closed position and movable from the open position against the interior of the bonnet, a valve stem passing through the bonnet connected with the movable valve element, of a supporting structure secured to the valve body overhanging and spaced above the valve bonnet, said supporting structure having a vertical column thereon through which the valve stem moves when the valve element is moved up and down, said column having a height greater than the normal length of travel of the valve stem between the closed and open position of the valve and sufficient to enable the valve stem to be raised to a position where the valve element is raised clear of the valve body when the bonnet is unfastened therefrom, the column being open down one side to enable the valve stem with valve parts suspended therefrom to be moved laterally from above the valve body, a cross head on the valve stem guided in the column, and operating means mounted on said structure connected with the cross head for moving the valve stem.

3. The combination with a valve having a body, a detachable bonnet at the top of the body, a movable valve element in the body movable in a normal range between an open and closed position and movable from the open position against the interior of the bonnet, a valve stem passing through the bonnet connected with the movable valve element, of a supporting structure secured to the valve body overhanging and spaced above the valve bonnet, said supporting structure having a vertical column thereon through which the valve stem moves when the valve element is moved up and down, said column having a height greater than the normal length of travel of the valve stem between the closed and open position of the valve and sufficient to enable the valve stem to be raised to a position where the valve element is raised clear of the valve body when the bonnet is unfastened therefrom, the column being open down one side to enable the valve stem with valve parts suspended therefrom to be moved laterally from above the valve body, a sheave at the top of the vertical column, a cable connected with the valve stem passing over said sheave, a counterweight on the exterior of the column and guided thereby attached to the other end of the cable, and operating means on the supporting structure for moving the valve stem up and down.

4. The combination defined in claim 3 wherein the operating mechanism comprises a rotatable shaft, means for reversibly driving the shaft, a pair of arms on the shaft one extending to each side of the column, a cross head detachably secured to the valve stem, said arms being pivotally connected with the cross head to impart rectilinear movement thereto upon arcuate movement of the arms when the shaft is rotated.

References Cited in the file of this patent

UNITED STATES PATENTS

| | | |
|---|---|---|
| 1,168,332 | Riley | Jan. 18, 1916 |
| 1,331,305 | Wilkinson | Feb. 17, 1920 |
| 2,212,370 | Jensen | Aug. 20, 1940 |
| 2,255,829 | Spang | Sept. 16, 1941 |
| 2,746,470 | Laird | May 22, 1956 |
| 2,937,657 | Miller | May 24, 1960 |